(12) United States Patent
Weber

(10) Patent No.: US 8,882,956 B2
(45) Date of Patent: Nov. 11, 2014

(54) COMPOSITE STRUCTURES USING INTERPENETRATING POLYMER NETWORK ADHESIVES

(75) Inventor: Gary Robert Weber, Kent, WA (US)

(73) Assignee: The Boeing Company, Chicago, IL (US)

(*) Notice: Subject to any disclaimer, the term of this patent is extended or adjusted under 35 U.S.C. 154(b) by 437 days.

(21) Appl. No.: 12/873,537

(22) Filed: Sep. 1, 2010

(65) Prior Publication Data

US 2012/0052305 A1 Mar. 1, 2012

(51) Int. Cl.
| | | |
|---|---|---|
| B29C 65/14 | (2006.01) | |
| B29C 65/52 | (2006.01) | |
| C08F 283/06 | (2006.01) | |
| C08F 283/10 | (2006.01) | |

(52) U.S. Cl.
USPC ............... 156/275.5; 156/275.7; 156/273.5; 525/404

(58) Field of Classification Search
USPC ............... 428/411.1, 414; 525/404; 524/539; 156/273.5, 275.5, 275.7
See application file for complete search history.

(56) References Cited

U.S. PATENT DOCUMENTS

| | | | |
|---|---|---|---|
| 5,709,948 A | 1/1998 | Perez et al. | |
| 5,997,682 A * | 12/1999 | Goodman et al. | 156/273.7 |
| 7,572,491 B2 * | 8/2009 | Wang et al. | 428/1.5 |
| 7,790,288 B2 | 9/2010 | Perez et al. | |
| 2006/0283133 A1 * | 12/2006 | Westre et al. | 52/729.1 |
| 2007/0036982 A1 | 2/2007 | Perez et al. | |
| 2009/0095413 A1 * | 4/2009 | Westre et al. | 156/257 |

FOREIGN PATENT DOCUMENTS

| | | |
|---|---|---|
| EP | 2426180 A2 | 3/2012 |
| WO | WO 9700923 A1 * | 1/1997 |

OTHER PUBLICATIONS

Janke et al., "Electron Beam Curing of Epoxy Resins by Cationic Polymerization," Proceedings of 41st International SAMPE Symposium and Exhibition, Mar. 1996, pp. 196-206.
Janke et al., "Toughened Epoxy Resins Cured by Electron Beam Radiation," Proceedings of 28th International SAMPE Technical Conference, Nov. 1996, pp. 877-889.
Kerluke et al., "Electron Beam Processing for Automotive Composite Application," 2002, 5 pages.
Lopata et al., "Electron Beam Processing for Composite Manufacturing and Repair," Radtech Report, Sep./Oct. 2003, vol. 17, No. 5, pp. 32-42.
Polymerics GmbH, "High Temperature Resistant IPN Adhesives," http://polymerics.de/products/ipn_en.html, Jan. 2002, 2 pages.
Chen et al., "Curing kinetics and morphology of IPNs from a flexible dimethacrylate and a rigid epoxy via sequential photo and thermal polymerization," European Polymer Journal, vol. 44, No. 6, Jun. 2008, pp. 1796-1813.
Dean et al., "Azo initiator selection to control the curing order in dimethacrylate/epoxy interpenetrating polymer networks," Polymer International, vol. 53, No. 9, Sep. 2004, pp. 1305-1313.

(Continued)

*Primary Examiner* — Thao T. Tran
(74) *Attorney, Agent, or Firm* — Yee & Associates, P.C.

(57) ABSTRACT

An interpenetrating polymer network (IPN) adhesive comprises an acrylated polymer system curable by radiation, and a flexible epoxy system thermally curable after the acrylated polymer system is cured.

5 Claims, 5 Drawing Sheets

(56) References Cited

OTHER PUBLICATIONS

Dean et al., "Effect of Curing Sequence on the Photopolymerization and Thermal Curing Kinetics of Dimethacrylate/Epoxy Interpenetrating Polymer Networks," Macromolecules, vol. 35, No. 21, Oct. 2002, pp. 7942-7954.

Dean et al., "Small angle neutron scattering and dynamic mechanical thermal analysis of dimethacrylate/epoxy IPNs," European Polymer Journal, vol. 42, No. 10, Oct. 2006, pp. 2872-2887.

Dubuisson et al., "Homogeneous Epoxy-Acrylic Interpenetrating Polymer Networks: Preparation and Thermal Properties," Polymer Bulletin, vol. 3, No. 6-7, Nov. 1980, pp. 391-398.

Hara, "Curing Agents for Epoxy Resin," Three Bond Technical News, vol. 32, Dec. 1990, 10 pages.

Lin et al., "Kinetics studies of hybrid structure formation by controlled photopolymerization," Polymer, vol. 44, No. 17, Aug. 2003, pp. 4781-4789.

Nowers et al., "Structure-property relationships in acrylate/epoxy interpenetrating polymer networks: Effects of the reaction sequence and composition," Journal of Applied Polymer Science, vol. 104, No. 2, Apr. 2007, pp. 891-901.

Nowers et al., "The effect of interpenetrating polymer network formation on polymerization kinetics in an epoxy-acrylate system," Polymer, vol. 47, No. 4, Feb. 2006, pp. 1108-1118.

Oxman et al., "Evaluation of initiator systems for controlled and sequentially curable free-radical/cationic hybrid photopolymerizations," Journal of Polymer Science Part A: Polymer Chemistry, vol. 43, No. 9, May 2005, pp. 1747-1756.

Park et al., "UV—and thermal-curing behaviors of dual-curable adhesives based on epoxy acrylate oligomers," International Journal of Adhesion & Adhesives, vol. 29, No. 7, Oct. 2009, pp. 710-717.

Sands et al., "Interpenetrating Polymer Network (IPN) Adhesives for Electron Beam Cure," Army Research Laboratory Report No. ARL-TR-2321, Sep. 2000, 49 pages.

Davis, "General Characteristics of Engineering Plastics," Guide to Materials Selection, Engineered Materials Handbook Desk Edition, ASM International, 1995, 5 pages.

\* cited by examiner

COMPOSITE STRUCTURES USING INTERPENETRATING POLYMER NETWORK ADHESIVES

TECHNICAL FIELD

This disclosure generally relates to composite structures, and deals more particularly with adhesives used in such composites.

BACKGROUND

Composite structures comprising parts that have different coefficients of thermal expansion may induce residual stresses in the structure during thermal curing or other fabrication processes that cause the parts to thermally expand at different rates. For example, and without limitation, hybrid composite structures comprising a metal reinforced with carbon fiber polymers may be subject to thermal induced distortion while curing at elevated temperatures. In some cases, this problem may be addressed by using fiber reinforced polymers that cure at room temperature, or which may be cured using various forms of radiation. However, room temperature cure polymers may have a short working life, long cure times, and require extra clean-up work. Room temperature cure polymers may also exhibit reduced performance characteristics compared to polymers that are cured at elevated temperatures. Known radiation cured adhesives may be more brittle than desired and exhibit lower than desired toughness, which may render these adhesives unsuitable for some applications, particularly where resistance to impact loads is valued.

Interpenetrating polymer networks (IPN) have been used as an adhesive in composite structures. IPNs are based on polymer systems that cure at different temperatures using differing cure mechanisms, but may exhibit properties that are superior to those of their constituent polymer systems. However, IPNs have not been adapted for solving the problem of residual stresses that are induced in composites by the differential expansion of the components of which the composite is formed.

Accordingly, there is a need for an IPN adhesive that may be used to reduce or eliminate residual stresses in composite structures that may be caused by differential expansion of differing components used in the structure, such as metals reinforced with carbon fiber polymers. There is also a need for a method of making composite structures that employ IPN adhesives to reduce or eliminate the residual stresses.

SUMMARY

The disclosed embodiments provide an IPN adhesive that can be used to fabricate composite structures, and particularly hybrid structures employing both polymer resins and metals that may substantially reduce residual stresses in the structure caused by differential thermal expansion of the composite materials. The disclosed IPN adhesive comprises two polymer adhesive systems that may be cured at differing temperatures. One of the polymer systems may be cured at room temperature using a beam of radiation, such as an electron beam. Curing of the first polymer system at room temperature holds the composite parts together so that they are fixed relative to each other as the structure is being fully cured. Curing of the second polymer adhesive is achieved by thermal cycling at elevated temperatures. The second polymer adhesive, when cured, remains flexible which may renders the composite structure more tolerant of impact loads, and less susceptible to barely visible impact damage (BVID).

In addition to increasing strength and durability, use of the disclosed IPN adhesive may result in weight savings by providing an effective way to reinforce metal parts such as aluminum, and may reduce tooling costs complexity while reducing process flow times.

According to one disclosed embodiment, a method is provided of bonding two parts together. The method comprises placing the parts together with a layer of IPN adhesive between the parts and attaching the parts to each other by curing the first polymer system of the IPN adhesive using radiation energy. The method further comprises thermally curing a second flexible polymer system of the IPN adhesive after the first polymer system has been cured. Curing the first adhesive system is performed substantially at room temperature using a beam of radiation, such as an electron beam, and the second adhesive system is thermally cured at a temperature above room temperature. The first polymer system is cured to at least a stage which renders the part sufficiently rigid to allow the part to be handled during subsequent processing steps. The first polymer system may comprise an acrylated epoxy that forms a substantially continuous structure when cured that attaches and holds the parts together until the second polymer system is cured. The second polymer system may be selected from the group consisting of a substantially flexible epoxy and a substantially flexible vinyl ester.

According to another disclosed embodiment, a method is provided of fabricating a composite structure. The method comprises laying up first and second composite laminates each having a fiber reinforced IPN matrix including a first polymer adhesive system, and a flexible second polymer adhesive system. The method further comprises curing the first polymer adhesive system and assembling the first and second laminates together with a layer of the second polymer adhesive system therebetween. The method further comprises curing the second polymer adhesive system. The first polymer adhesive system is cured substantially at room temperature by a beam of radiation. The second polymer adhesive system is cured by co-curing the assembled laminates and the layer of adhesive during a thermal cure cycle after the first polymer adhesive system has been cured.

According to still another embodiment, an IPN adhesive comprises an acrylated polymer system curable by radiation, and a flexible epoxy system cured after the acrylated polymer system is cured. The acrylated polymer system may comprise an acrylated epoxy, and the radiation may be selected from the group consisting of an electron beam, ultraviolet light and x-ray radiation. The flexible polymer system may be one selected from a group consisting of a flexible epoxy and a flexible vinyl ester.

In accordance with another embodiment, a reinforced composite structure is provided. The composite structure comprises a reinforcement, and a matrix in which the reinforcement is embedded. The matrix includes an IPN forming a gradient interface around the reinforcement resulting in improved shear force transfer from the matrix to the reinforcement. The reinforcement may include fibers selected from the group consisting of carbon, fiberglass and an aramid. The IPN is a bi-continuous structure including an acrylated polymer and a flexible epoxy.

BRIEF DESCRIPTION OF THE ILLUSTRATIONS

DETAILED DESCRIPTION

Figure 1:
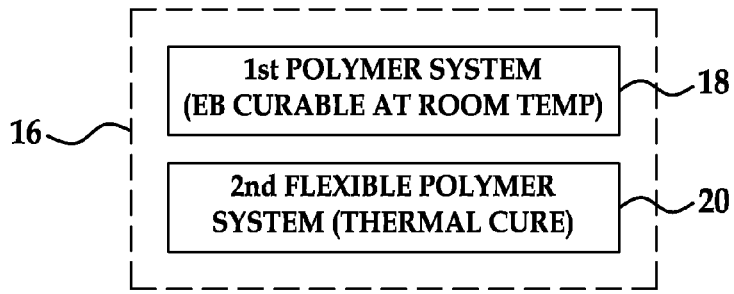
FIG. 1 is an illustration of a functional block diagram of an IPN adhesive according to the disclosed embodiments.

Referring first to FIG. 1, the disclosed embodiments relate to a full-interpenetrating network (IPN) adhesive 16 which may be used as a bonding adhesive or as a matrix in composite structures. The IPN adhesive 16 broadly comprises a first polymer system 18 and a second, flexible polymer system 20. The first polymer system 18 may be cured at or near room temperature using a beam (not shown) of radiation, such as an electron beam, however other forms of radiation including but not limited to UV (ultra violet) and X-ray radiation may be employed. The second polymer system 20 exhibits flexibility and toughness following curing, which is performed at elevated temperature during a suitable thermal cure cycle. As will be described below in more detail, the first polymer system 18 is cured at or near room temperature during the fabrication process to adhesively bond and effectively lock two or more parts (not shown) together. The adhesive bond formed between the parts by the first polymer system 18 holds the parts in place and prevents them from differentially expanding while the second polymer system 20 is thermally curing. Locking the parts together in this manner may reduce or eliminate the possibility of distortion of the parts during the fabrication process. The flexible second polymer system 20 provides the bond with both flexibility and toughness.

The first polymer system 18 may comprise an acrylated polymer such as acrylated epoxy. For example and without limitation, the acrylated epoxy may comprise one of bisphenol A diacrylate (BPADA) with a trifunctional acrylate, and trimethylolpropane triacrylate (TMPTA) cross-linking agent. The second flexible polymer system 20 may be one selected from the group consisting of flexible epoxies and vinyl esters. For example and without limitation, the second flexible polymer system may be one of Bis(3,4-EpoxyCyclohexylmethyl) Adipate (BECA) and the combination of a Diglycidyl ether of bisphenol A (DGEBA) with a Polypropylene Glycol Diglycidyl Ether (PPGDE) chain extender with an imidazole such as 2-Ethyl 4-Methylimidazole (EMI) or an anhydride as the curing catalyst.

Although not shown in the Figures, the second flexible polymer system 20 may include a suitable thermal cure initiator, such as, without limitation, imidazole or anhydride for cross linking the second polymer system 20. In one practical embodiment, the IPN adhesive 16 comprises approximately 67% acrylate and 33% flexible epoxy (including the curing agent). In another practical embodiment, the IPN adhesive 16 comprises approximately 40% acrylate, and approximately 60% flexible epoxy.

Figure 2:
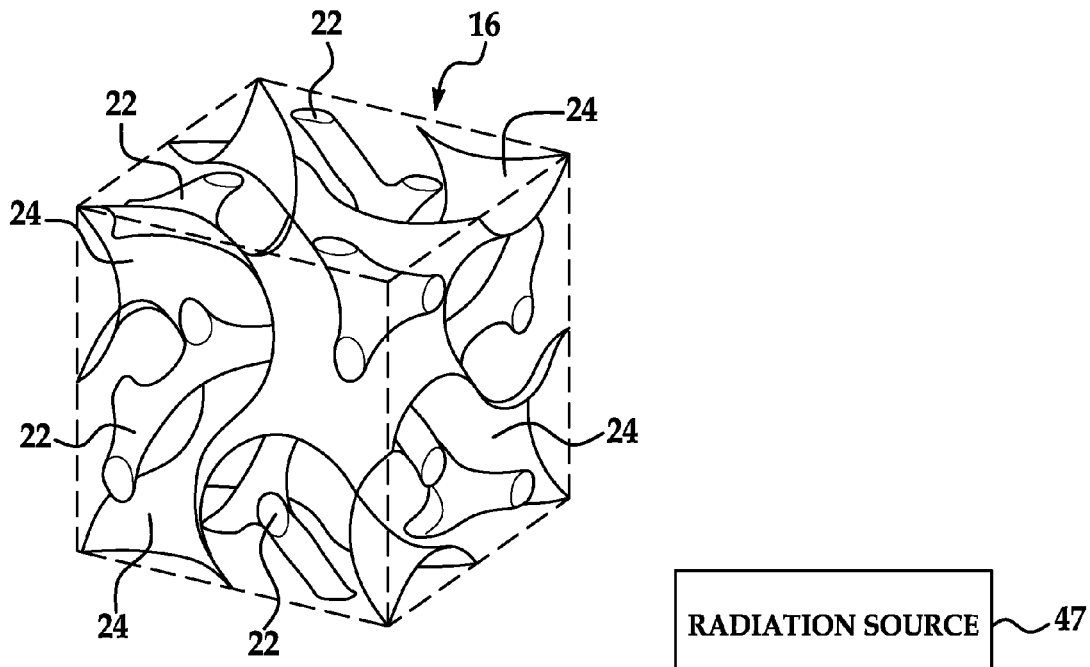
FIG. 2 is an illustration of the IPN adhesive of FIG. 1, showing a bi-continuous structure formed by dual polymer adhesive systems.

FIG. 2 illustrates the IPN adhesive 16 in a fully cured state in which the two polymer systems 18, 20 respectively form bi-continuous structural networks 22, 24 that are intertwined to form what is sometimes referred to as a double gyroidal structure. The structural network 22 formed by the first polymer system 18 may function as a relatively high strength adhesive to bond parts together, but which may exhibit some degree of brittleness. The second structural network 24 formed by the second polymer system 20 is relatively flexible, providing the IPN adhesive 16 with resistance to impact loading.

Figure 3:
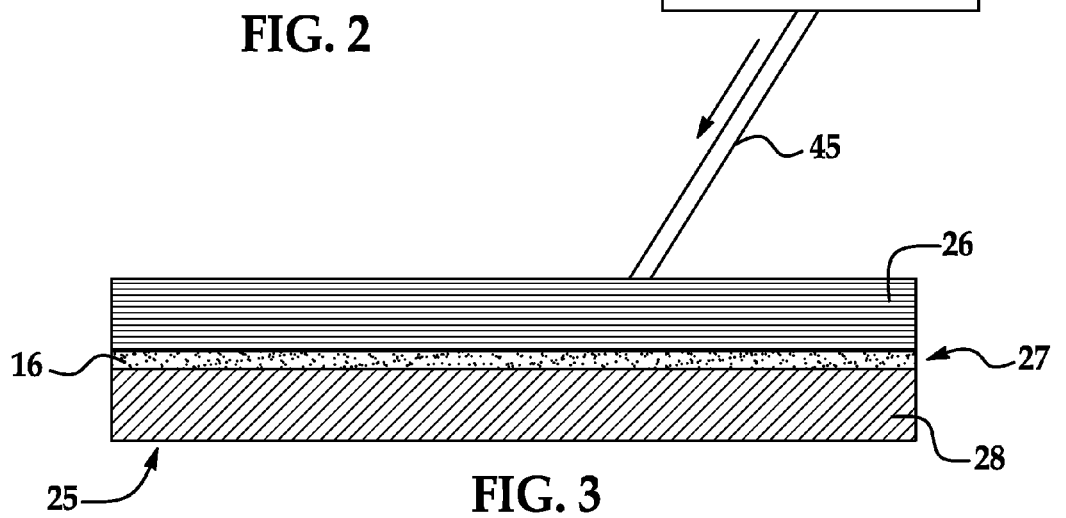
FIG. 3 is a sectional view of a hybrid composite structure, in which the parts are bonded together using the IPN adhesive.
Figure 4:
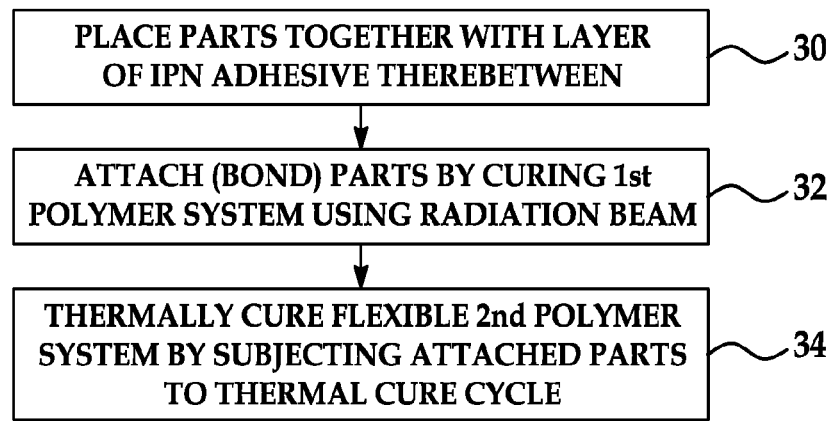
FIG. 4 is an illustration of a flow diagram of a method of bonding two parts of FIG. 3 together using the IPN adhesive.

FIG. 3 illustrates a hybrid composite structure 25 comprising two parts 26, 28 which may respectively comprise for example and without limitation, a composite laminate, and a metal. The two parts 26, 28 may be bonded together using a layer 27 of the IPN adhesive 16. Referring also now to FIG. 4, the hybrid composite structure 25 may be fabricated by a method that begins at step 30 in which the parts 26, 28 are placed together with the layer 27 of the IPN adhesive 16 therebetween.

Next, at step 32, the parts 26, 28 are bonded together by curing the first polymer system 18 (FIG. 1) using a beam 45 of radiation (FIG. 5) that is directed onto the structure 25 from a suitable radiation source 47. The curing process performed at step 32 may be carried out at or near room temperature, consequently the parts 26, 28 are initially bonded together without differential expansion that may be caused by curing at elevated temperatures. Finally, at step 34, the second polymer system 20 is thermally cured by subjecting the assembled composite structure 25 to a thermal cure cycle at elevated temperatures. During this thermal curing, differential thermal expansion of the parts 26, 28 is substantially reduced or eliminated due to the fact that the parts 26, 28 have already been bonded together, and thus are fixed relative to each other by the first polymer system.

Figure 5:
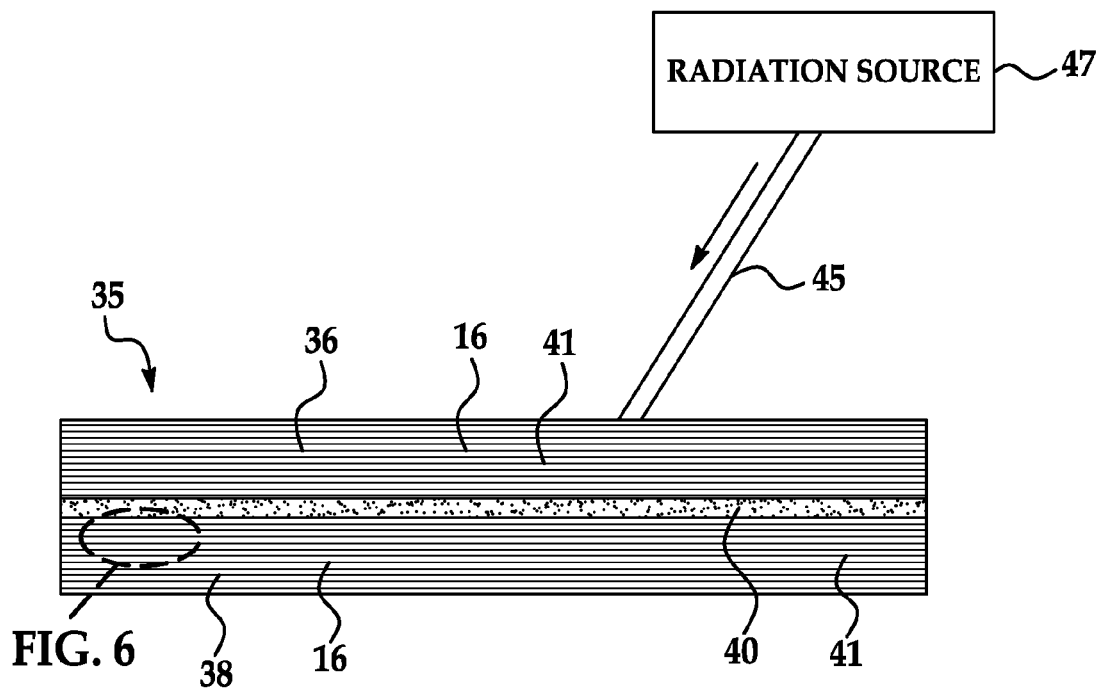
FIG. 5 is an illustration of a sectional view of two co-cured composite laminates joined together by a layer of the IPN adhesive.
Figure 6:
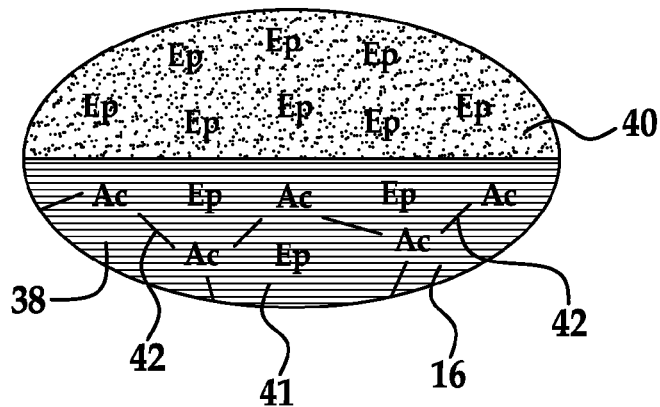
FIG. 6 is an illustration of the area designated as FIG. 6 in FIG. 5.

FIGS. 5 and 6 illustrate another application of the IPN adhesive 16 (FIG. 1). In this example, two multi-ply, fiber reinforced laminates 36, 38 are joined together by a layer 40 of a flexible polymer adhesive such as a flexible epoxy to form a composite structure 35. As shown in FIG. 6, each of the laminates 36, 38 comprises a fiber reinforcement 41 held and embedded in a matrix comprising the IPN adhesive 16 described previously. Thus, each of the laminates 36, 38 comprises bi-continuous first and second polymer systems 18, 20 as described above in connection with FIGS. 1 and 2, while the layer 40 comprises a thermally curable, flexible polymer such as a flexible epoxy which may be substantially the same as the second, flexible polymer system 20 forming part of the IPN adhesive matrix 16. As will be discussed below, when the composite structure 35 is fully cured, the flexible polymer system 20 (FIG. 1) extends continuously from one laminate 36 through bond layer 40 to the other laminate 38.

Figure 7:
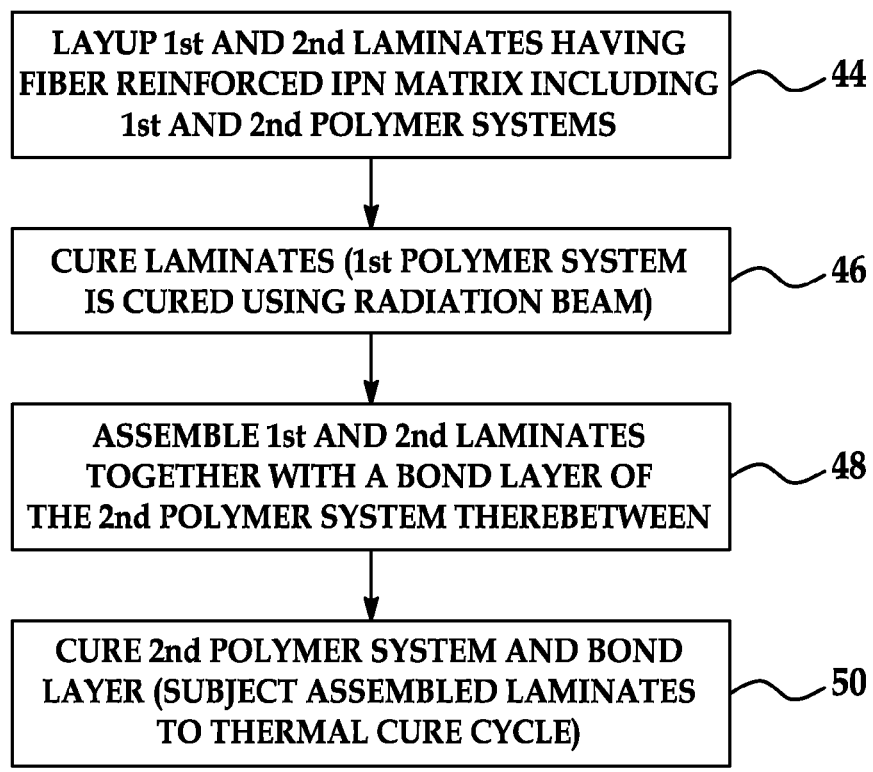
FIG. 7 is an illustration of a flow diagram of a method of fabricating the composite structure shown in FIGS. 5 and 6.

FIG. 7 illustrates a method of fabricating the composite structure 35 shown in FIGS. 5 and 6. Beginning at 44, first and second laminates 36, 38 are formed by laying up plies (not shown) of prepreg (not shown) using conventional processes and tooling suitable for the application. IPN adhesive 16 comprising the two unreacted, bi-continuous polymer systems 18, 20 (FIG. 1) is used as the ply matrix into which the fiber reinforcement 41 is embedded. Next, at step 46, each of the laminates 36, 38 is cured to at least a stage that allows the laminates to be handled by directing a beam 45 of radiation produced by a suitable radiation source 47 onto each of the laminates 36, 38. The radiation beam 45 may comprise an electron beam (EB), a UV beam or a beam of X-rays. This radiation beam curing, which may be carried out at or near room temperature, results in curing of the first polymer system 18 which forms one component of the ply matrix, and cross linking, shown by the numeral 42 in FIG. 6, of the first polymer system 18.

At this point, the second polymer system 20 remains unreacted, however the curing of the first polymer system 18 stiffens the laminate 36, 38 to at least a stage allowing them to be handled as necessary for further processing. In fact, the following the room temperature curing, the laminates 36, 38 may have nearly as much rigidity as fully cured laminates, consequently, when placed together under pressure in tooling (not shown), the laminates 36, 38 may exhibit little or no deformation. At step 48, the laminates 36, 38 are assembled together using a bond layer 40 of a flexible, thermally curable polymer that may be substantially the same as that comprising the second, flexible polymer system 20 forming part of the IPN adhesive 16. With the laminates 36, 38 having been assembled, then at step 50, the second polymer system 20 along with the bond layer 40 are co-cured by subjecting the assembled laminates 36, 38 to a thermal cure cycle. It should be noted here that when imidazol is used as a curing agent, it results in a 2-step curing process. The first step is an epoxy adduct stage where the imidazole molecules simply attach themselves to the ends of epoxy molecules; this occurs at approximately 60 degrees C. and results in a significant increase in viscosity. The second step to the curing process is cross-linking of epoxies and epoxy adducts which occurs at approximately 160 degrees C.

Figure 8:
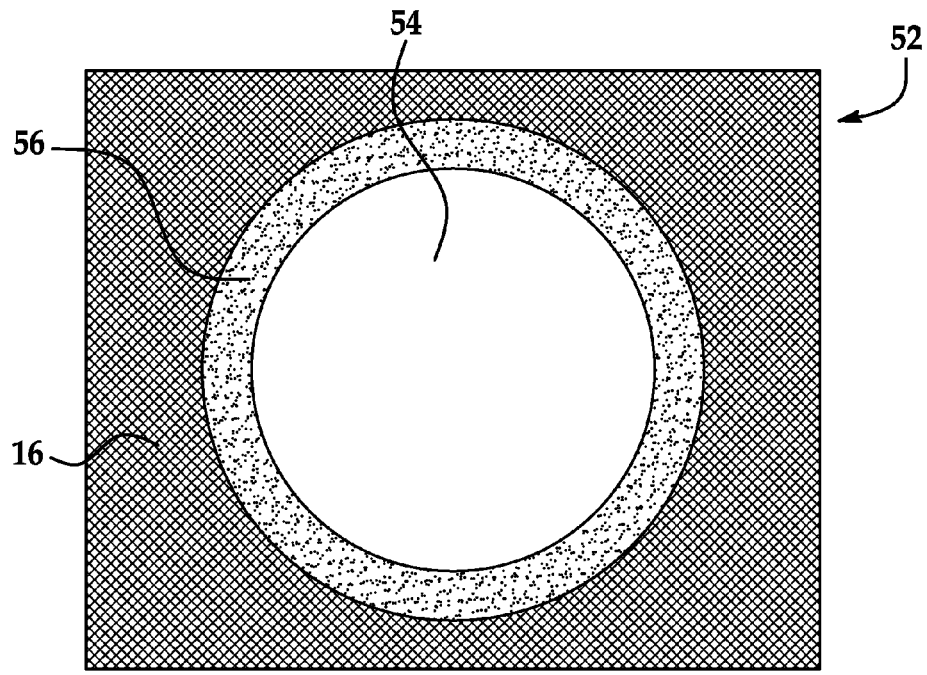
FIG. 8 is an illustration of a fiber embedded in an IPN adhesive matrix in which a gradient interface has been formed around the fiber.

FIG. 8 illustrates the use of the previously described IPN adhesive 16 as a matrix for holding a reinforcement 54 which may comprise fibers, beads, particles or other reinforcing media. As in previous examples, the IPN adhesive 16 comprises first and second polymer systems 18, 20 (FIG. 1) which are respectively curable at differing temperatures. The second polymer system 20 (FIG. 1) which may comprise a flexible epoxy, has a higher surface tension than the first polymer system 18 which may comprise an acrylated epoxy. This higher surface tension causes the flexible second polymer system 20 to preferentially attach to the reinforcement 54, resulting in a gradient interface 56 around the reinforcement 54 that is somewhat flexible. The flexibility provided by the gradient layer 56 is advantageous in that it may assist in better transferring shear forces from the reinforcement 54 to the IPN adhesive matrix 16. Also, the gradient layer 56 may aid in establishing an improved bond between the IPN adhesive matrix 16 and the reinforcement 54. For example, where the IPN adhesive matrix 16 includes an acrylate that may not bond well to reinforcement 54 that is a carbon fiber, the flexible material forming the gradient layer 56 may improve the bond between the adhesive matrix 16 and the carbon fiber 54.

Use of the IPN 16 resulting in the formation of the gradient layer 56 may be advantageously employed in fabricating filament wound products (not shown). At the conclusion of wet filament winding or an RTM (resin transfer molding) process, an electron beam head (not shown) can be swept over the part to provide the initial cure. The entire structure will be dimensionally locked by this room temperature curing step, which may avoid the need for expensive tooling or autoclaves for the secondary thermal cure cycle.

Figure 9:
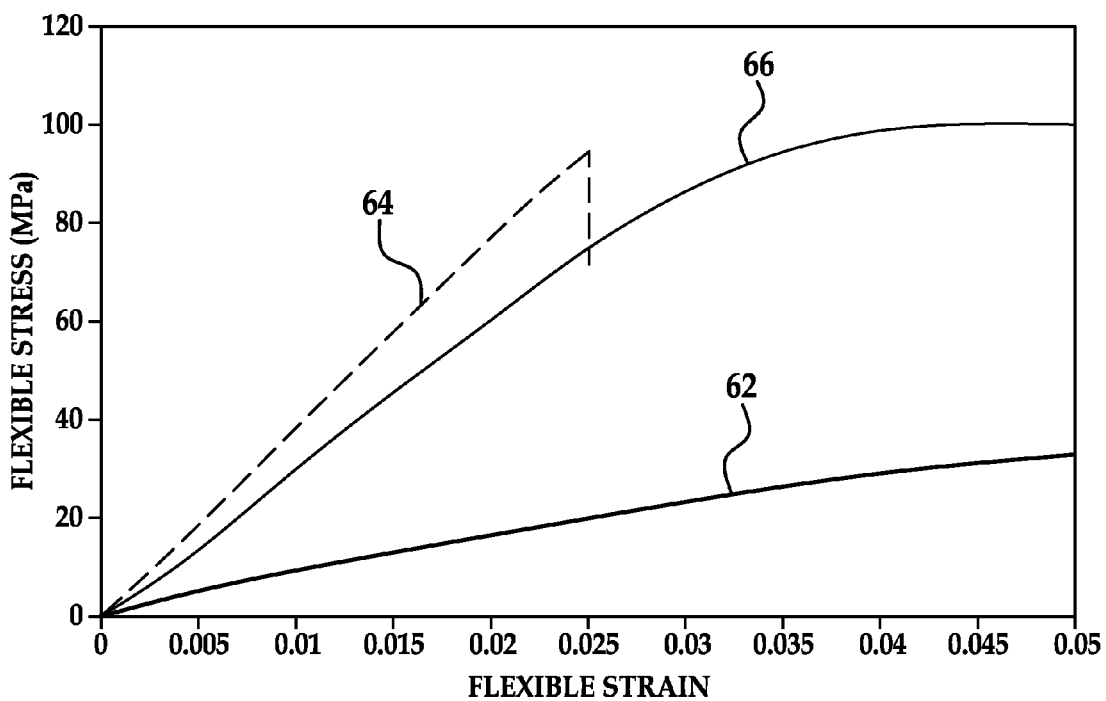
FIG. 9 is an illustration of a graphical plot useful in explaining the synergy between the polymer systems used in the disclosed IPN adhesive.

Attention is now directed to FIG. 9 which is a stress-strain performance plot that illustrates the synergy provided by the systems 18, 20 forming the disclosed IPN adhesive 16. Curve 62 shows the performance of a flexible epoxy comprising a 50/50 mixture of two typical flexible epoxy components, while curve 64 shows the performance of a typical acrylate that includes 20% a content of a trifunctional acrylate. Curve 66 represents the performance of the disclosed IPN adhesive 16, which in this example, comprises a 50/50 combination of the flexible epoxy mixture represented by curve 62 and the acrylate mixture represented by curve 64.

Rather than lying half way between the curves, 62, 64, as might be normally expected, the performance of the dual system IPN 16 shown by curve 66 indicates that the IPN 16 has a modulus that approaches that of the stiffer acrylate (curve 64), and an elongation that approaches that of the flexible epoxy (curve 62). Thus, the first polymer system 18 (FIG. 1) provides the strength necessary for holding parts together but may have limited ability to deform upon an impact load, while the flexible second polymer system 20 provides the IPN 20 with the flexibility required to withstand impact loads. The second flexible polymer system 20 effectively allows the first polymer system 18 to move around and flex.

Figure 10:
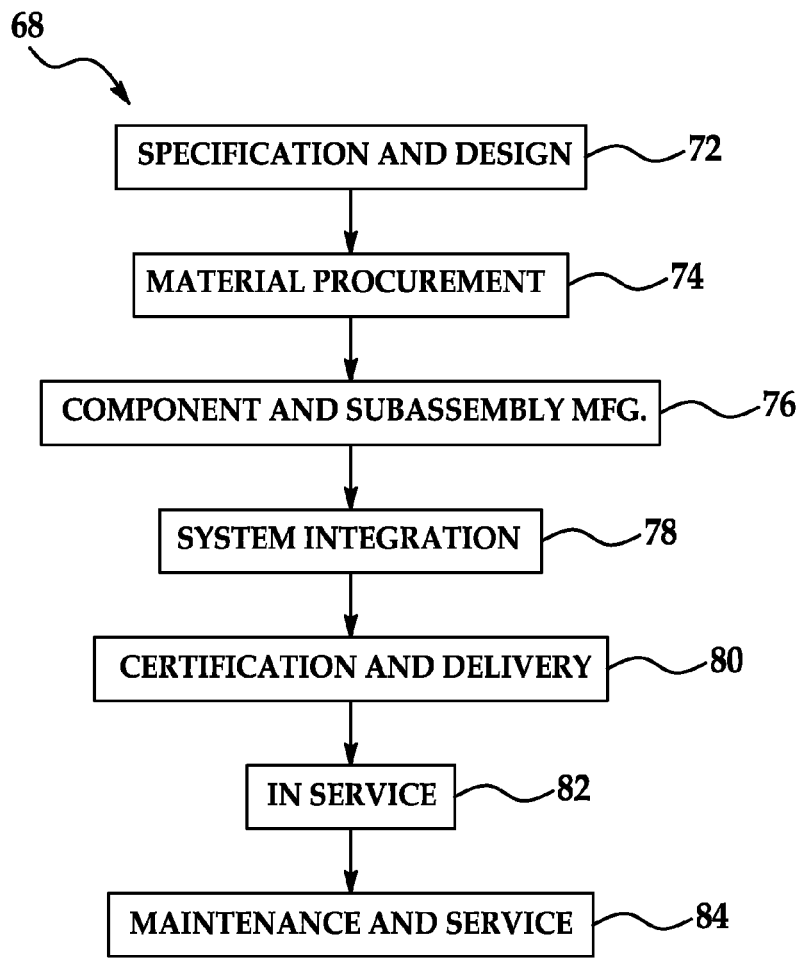
FIG. 10 is a flow diagram of aircraft production and service methodology.
Figure 11:
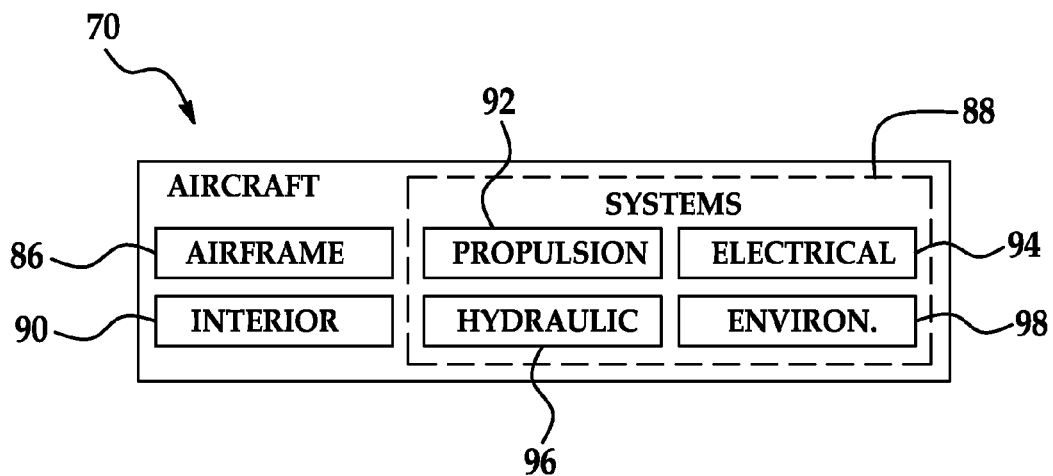
FIG. 11 is a block diagram of an aircraft.

Referring next to FIGS. 10 and 11, embodiments of the disclosure may be used in the context of an aircraft manufacturing and service method 68 as shown in FIG. 10 and an aircraft 70 as shown in FIG. 11. During pre-production, exemplary method 68 may include specification and design 72 of the aircraft 70 and material procurement 74. During production, component and subassembly manufacturing 76 and system integration 78 of the aircraft 70 takes place. The disclosed IPN adhesive 16 may be used to assemble parts and subassemblies as part of the manufacturing process step 76. Thereafter, the aircraft 70 may go through certification and delivery 80 in order to be placed in service 82. While in service by a customer, the aircraft 70 may be scheduled for routine maintenance and service 166 (which may also include modification, reconfiguration, refurbishment, and so on), in which the IPN adhesive 16 may be used to repair or refurbish parts and assemblies.

Each of the processes of method 68 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 70 produced by exemplary method 68 may include an airframe 86 with a plurality of systems 88 and an interior 90. Examples of high-level systems 88 include one or more of a propulsion system 92, an electrical system 94, a hydraulic system 96, and an environmental system 98. Any number of other systems may be included. The disclosed IPN adhesive 16 may be used to fabricate parts used in the airframe 86 and in the interior 90. Although an aerospace example is shown, the principles of the invention may be applied to other industries, such as the automotive industry.

The apparatus embodied herein may be employed during any one or more of the stages of the method 68. For example, components or subassemblies corresponding to production process 78 may be fabricated or manufactured in a manner similar to components or subassemblies produced while the aircraft 70 is in service. Also, one or more apparatus embodiments may be utilized during the production stages 76 and 78, for example, by substantially expediting assembly of or reducing the cost of an aircraft 152. Similarly, one or more apparatus embodiments may be utilized while the aircraft 68 is in service, for example and without limitation, to maintenance and service 84.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of bonding two parts together, the method comprising:
   placing the parts together with a layer of an interpenetrating polymer network (IPN) adhesive between the parts, the IPN adhesive contacting both parts, the parts comprising a metal part and a composite part, the composite part comprising a fiber reinforced polymer matrix;
   attaching the parts to each other by curing a first polymer system of the IPN adhesive using radiation energy, wherein the first polymer system is cured to a stage that allows handling of the parts; and
   thermally curing a second polymer system of the IPN adhesive after the first polymer system has been cured, wherein the second polymer system is selected from the group consisting of:
   bis(3,4-epoxy cyclohexylmethyl) adipate(BECA); and
   a combination of a diglycidyl ether of bisphenol A (DGEBA) with a polypropylene glycol diglycidyl ether (PPGDE) chain extender.

2. The method of claim 1, wherein:
   curing the first polymer system is performed substantially at room temperature using a beam of the radiation energy, and
   thermally curing the second polymer system is performed at a temperature above room temperature.

3. The method of claim 1, wherein the first polymer system is an acrylated epoxy forming a first substantially continuous structure when cured that attaches and holds the parts together until the second polymer system is cured.

4. The method of claim 1, wherein the parts have respectively different coefficients of thermal expansion.

5. A method of bonding two parts together, the method comprising:
   placing the parts together with a layer of an interpenetrating polymer network (IPN) adhesive between the parts, the parts comprising a metal part and a composite part, the parts being pieces of an aircraft, the composite part comprising a fiber reinforced polymer matrix, the IPN adhesive comprising:
   a first polymer system curable by radiation selected from the group consisting of an electron beam, ultraviolet light and x-rays, wherein the first polymer system includes at least one of —
   bisphenol A diacrylate (BPADA);
   a trifunctional acrylate; and
   trimethylolpropane triacrylate (TMPTA); and
   a second polymer system, the second polymer system being thermally curable, wherein the second polymer system includes a thermal cure initiator and is selected from the group consisting of bis(3,4-epoxy cyclohexylmethyl) adipate (BECA), and a combination of a diglycidyl ether of bisphenol A (DGEBA) with a polypropylene glycol diglycidyl ether (PPGDE) chain extender;
   attaching the parts to each other by curing the first polymer system of the IPN adhesive at room temperature using radiation energy until the parts have sufficient rigidity to be handled; and
   thermally curing a second polymer system of the IPN adhesive after the first polymer system has been cured using a thermal cure cycle above room temperature to form a cured IPN adhesive, the cured IPN adhesive having a modulus that approaches that of the first polymer system and an elongation that approaches that of the second polymer system.

\* \* \* \* \*